June 23, 1959     R. H. SIMMONS     2,891,420
SPEED RESPONSIVE POWER TRANSMISSION
Filed June 20, 1955     3 Sheets—Sheet 1
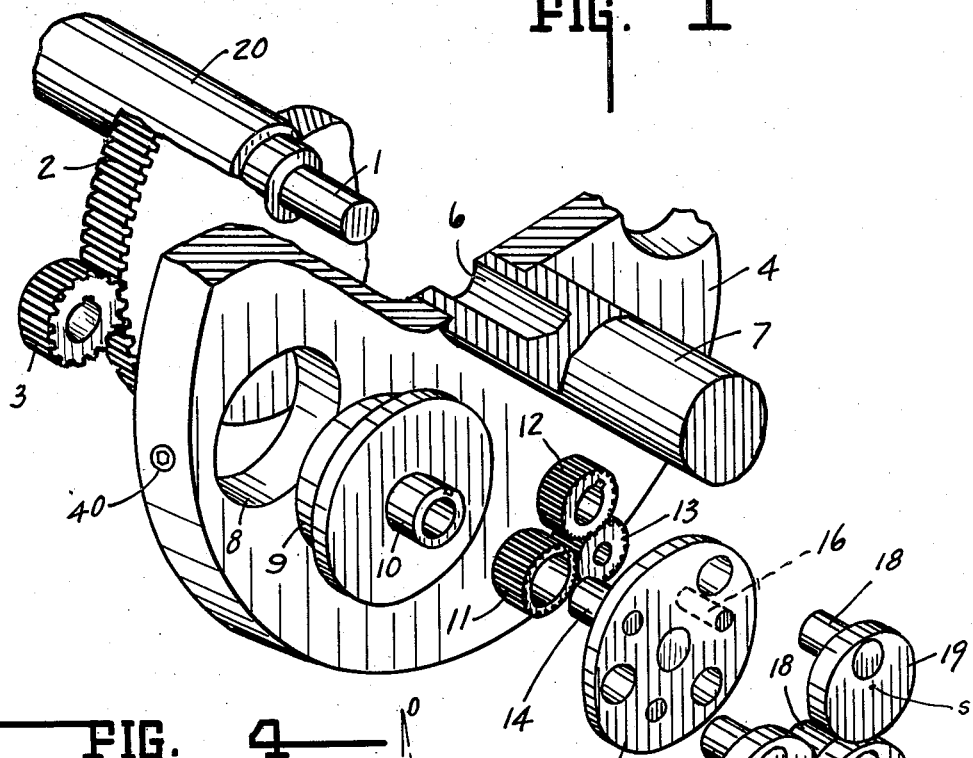
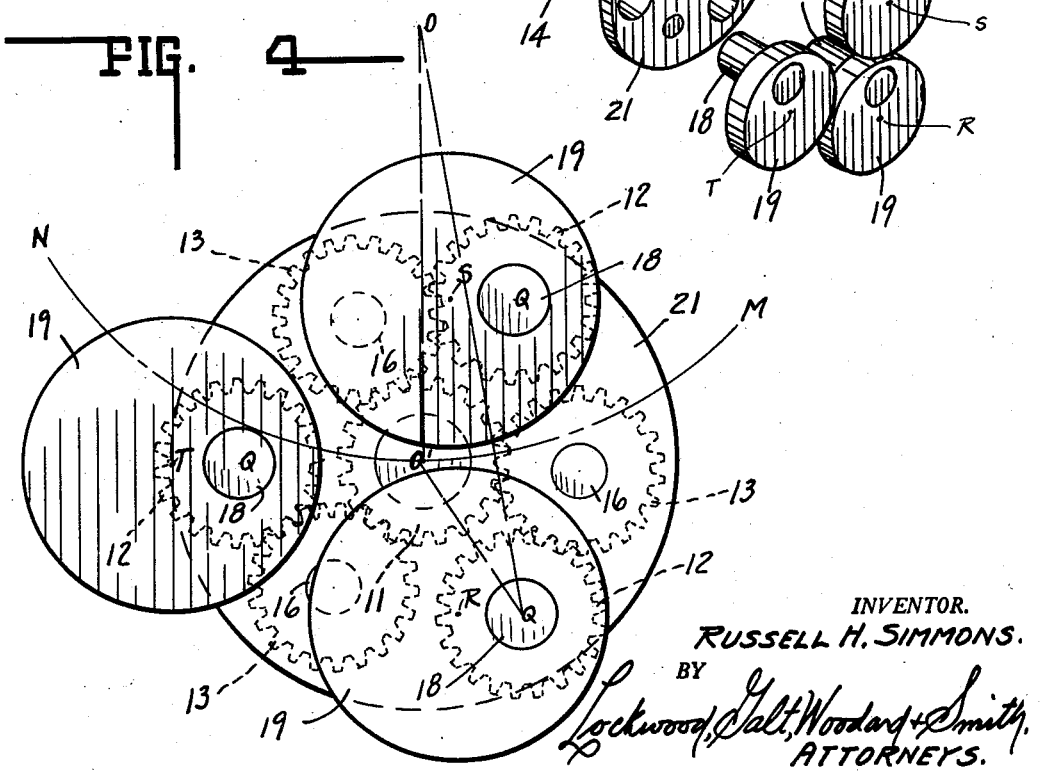
INVENTOR.
RUSSELL H. SIMMONS.
BY
Lockwood, Galt, Woodard + Smith,
ATTORNEYS.

June 23, 1959  R. H. SIMMONS  2,891,420
SPEED RESPONSIVE POWER TRANSMISSION
Filed June 20, 1955  3 Sheets-Sheet 2
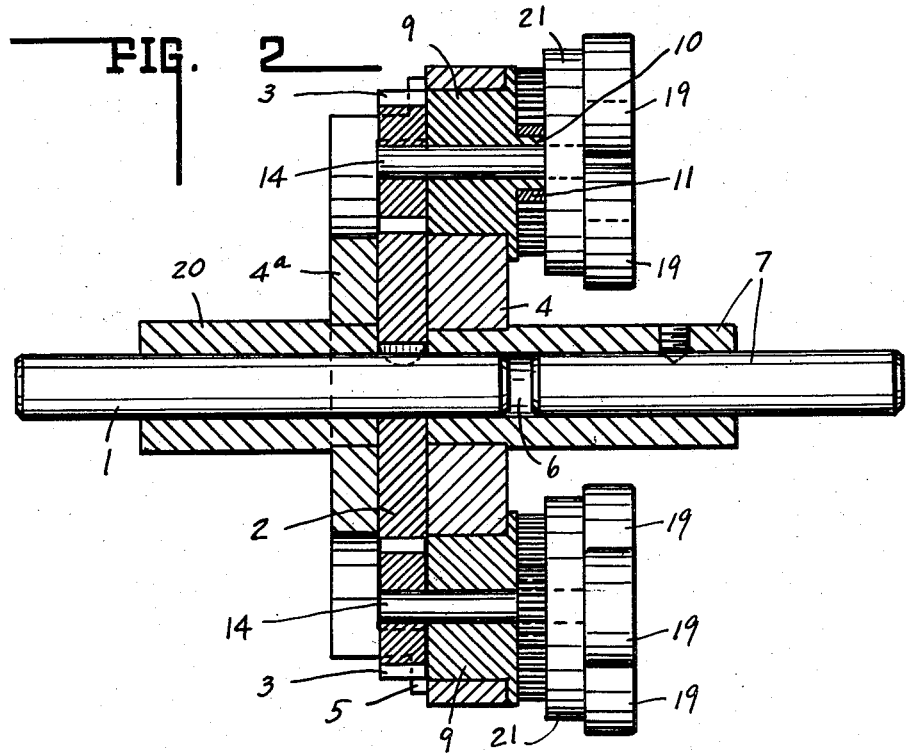
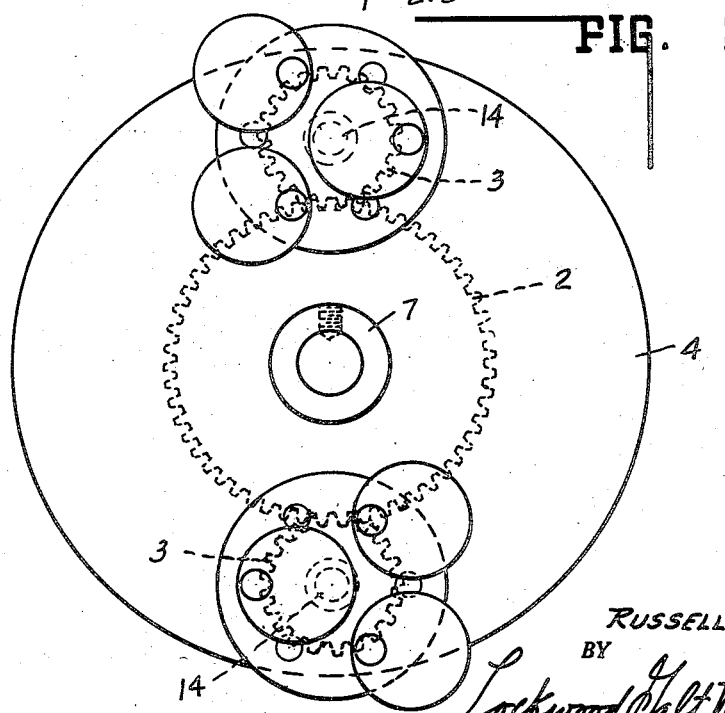
INVENTOR.
RUSSELL H. SIMMONS.
BY
Lockwood, Galt, Woodard & Smith
ATTORNEYS.

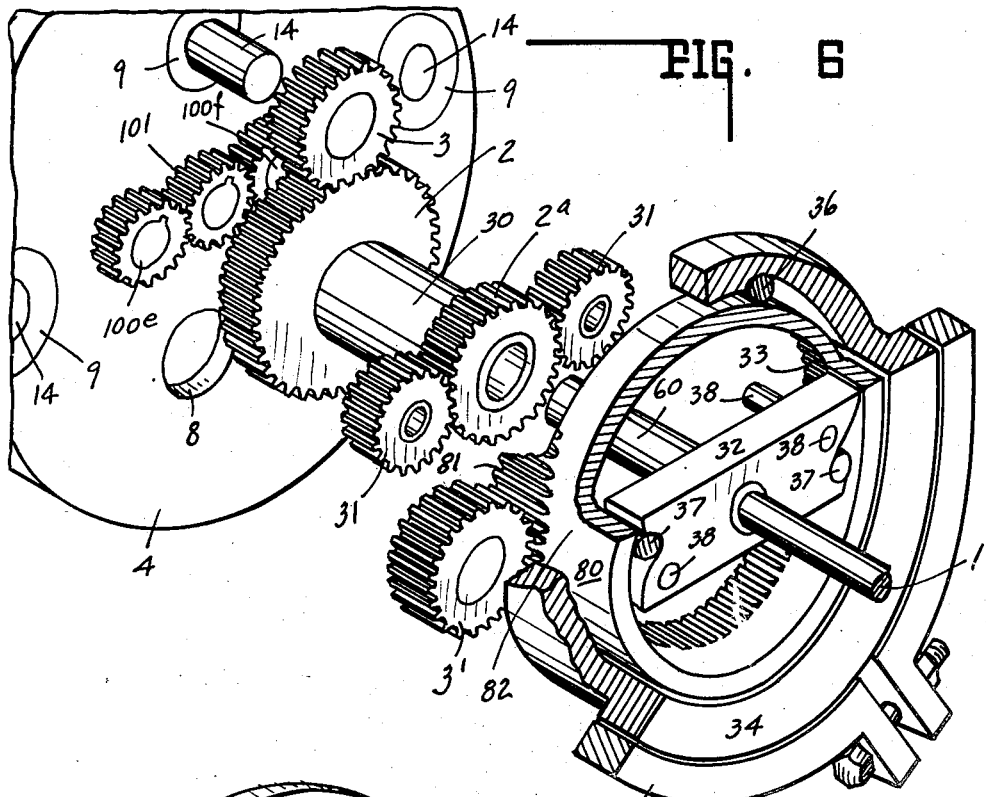
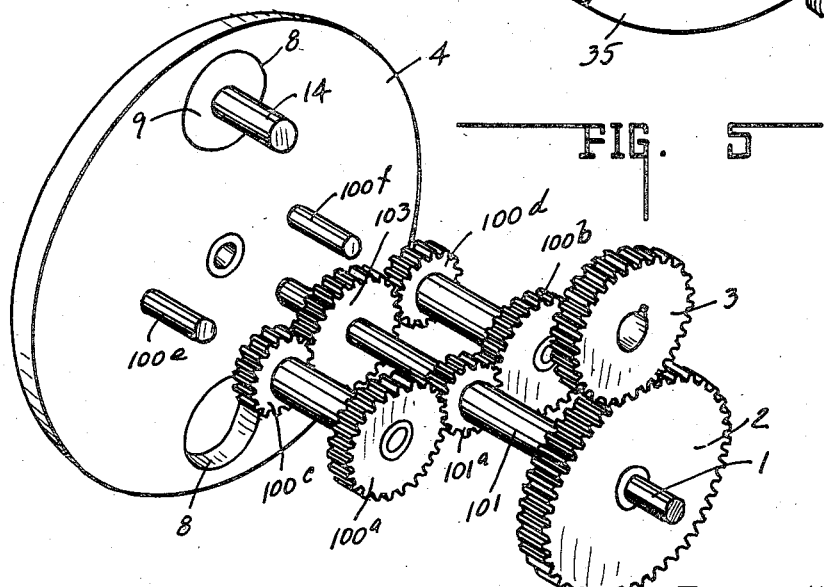

United States Patent Office 2,891,420
Patented June 23, 1959

2,891,420

SPEED RESPONSIVE POWER TRANSMISSION

Russell H. Simmons, Indianapolis, Ind.

Application June 20, 1955, Serial No. 516,558

1 Claim. (Cl. 74—752)

My invention relates to governors and is particularly directed to power transmissions in which the torque of a driving shaft is to be transmitted to a driven shaft.

In so-called "fluid drives," complementary face-to-face impellers on the adjacent ends of end-to-end shafts, run in an oil bath. The transmission of power between the impellers through the oil is an exponential function of the difference in speeds of the two impellers. Unfortunately, the slip of the driven impeller with respect to the driving impeller never reduces to zero, even for light loads, and the resulting power loss is dissipated in heat.

One of the objects of my invention is an improved drive which has the desirable power transmitting characteristics of the fluid drive but which has zero slip above a predetermined threshold speed determined by the load. At the lower driving speeds, the power transmitted and the slip are functions of the torque load on the driven shaft, while at the higher driving speeds, above said threshold speed, the slip becomes zero, the input and output shafts lock together, and the efficiency of transmission becomes 100 percent This and other objects of my invention are attained by coupling the peripheries of impeller-like discs on the adjacent ends of end-to-end driving and driven shafts, by planetary gears, the gears being coupled to eccentric weights in such a way that the centrifugal forces of the weights increase or decrease the drag on the gears as a function of speed and hence increase or decrease transmission of power between the discs. For all speeds at which the centrifugal force of the weights exceeds a force represented by the load torque, the driving and driven shafts are effectively locked together.

Other objects and features of my invention will become apparent by referring to specific embodiments described in the following specification and shown in the accompanying drawing in which:

Fig. 1 is an exploded perspective, partly sectioned, view of one embodiment of my improved power transmission.

Fig. 2 is a longitudinal sectional detail view of the specific power transmission shown in Fig. 1.

Fig. 3 is a plan or end view of the assembly of Fig. 1.

Fig. 4 is an end view of the governor sub-assembly shown in exploded relation in Fig. 1.

Fig. 5 is an exploded view of one embodiment of my invention including a planetary gear reduction.

Fig. 6 is an exploded view of one embodiment of my invention including a one-way clutch type device.

Referring to Fig. 1 the output shaft 20 of the power transmission is shown end-to-end with the power input shaft 7. Keyed to the adjacent ends of the input and output shafts 7 and 1 are the spider plate 4 and sun gear 2. Adjacent faces of the sun gear 2 and spider plate 4 are polished and adapted for relative rotation with low friction. The output shaft 20 is provided with a stub 1 for running in the recessed end 6 of the shaft 7 for maintaining true axial alignment of the two shafts. For structural reasons, the plate 4 as shown in Fig. 2 may be supplemented by a second plate 4a joined to plate 4 through the steel ring 5 to completely enclose the sun gear. The steel ring 5 is of such axial dimension as to closely enclose the sun gear 2 but permit the free rotation of the sun gear in the housing provided by the elements 4, 4a and 5. The casing details for the assembly of Figs. 1 and 2 and the primary journals therein for the driving and driven shafts 7 and 1 are not shown. Such a casing with an oil bath for the running parts is assumed.

Torque is transferred from the driving shaft 7 and its plate 4 to the sun gear 2 and its shaft 20 through planetary gears 3. Two or more planetary gears 3 evenly spaced along the periphery of sun gear 2 are preferred for symmetry of the mechanism and dynamic balance at high speeds.

It will be perceived that if planetary gear 3 rolls freely on the sun gear no power can be transmitted from the input to the output shafts of the transmission and that the housing 4, 4a, 5 will run freely over the sun gear 2. If, however, a drag is imposed upon planetary gear 3, transmission of power is effected and the amount of transmitted power is proportional to the drag. If this drag is greater than the load imposed upon output 20 and its sun gear 2, input and output shafts will rotate at the same speed.

The above mentioned drag, according to my invention, is effected by imposing on the planetary gear a torque produced by centrifugal force of weights eccentric to the center of rotation of the drive shaft. Planetary gear 3 (Figs. 1 and 2) is keyed to stub shaft 14 which shaft carries on its opposite end governor plate 21, which plate also is keyed to shaft 14. Shaft 14 is journalled in a bearing, preferably of the low friction type, in spider plate 4. For convenience of manufacture it has been found desirable to mount the journal for stub shaft 14 in the plug 9 which is drive-fitted in the enlarged opening 8 in the spider plate 4. Plug 9 is rotatively adjustable in manufacture in its hole 8 and may be locked in place as by the Allen set screw 40. An upstanding stub collar 10 is machined on plug 9 and is adapted to receive the secondary sun gear 11. Sun gear 11 is keyed against axial and longitudinal movement to collar 10. By making collar 10 and the bearing for stub shaft slightly eccentric in the plug 9, the depth of mesh of gears 2 and 3 may conveniently be adjusted.

To the underside of governor plate 21 is attached pin 16 set a measured distance from the center of the governor plate and may conveniently comprise a polished round steel pin driven through a drilled hole in the governor plate and extending to just short of the face of plug 9. The outer end of the pin is finished flush with the outer face of the governor plate 21. Journalled freely upon the pin 16 is the idler-planetary gear 13; the center to center distance between shaft 14 and pin 16 being adjusted to the pitch diameters of the gears 11 and 13 so that the planetary 13 meshes with and freely rolls on the secondary sun gear 11. Now, stub shaft 18 is low-friction journalled in governor plate 21 and is offset from pin 16 and shaft 14 so that the gear 12, keyed to the end of shaft 18, meshes with the idler-planetary gear 13. To the end of the shaft 18, opposite keyed gear 12, is keyed eccentric weight 19. The center of gravity S is offset from the center of rotation of the weight, at the center of shaft 18, a predetermined distance dictated by the mass of weight 19 and its angular velocity about both center O (Fig. 1) of the driving shaft 7 and about the center Q of shaft 18. The center of rotation of plate 21 is labeled O'.

While a single eccentric weight 19 on governor plate 21 is operative in the manner hereinafter described, it is preferred for the sake of dynamic symmetry of the rotating parts to provide two, three or more eccentric weights as shown. Each weight is coupled through its pinion 12 and idler-planetary 13 to the sun gear 11. Three weights 19 are shown in Figs. 1 and 2, although the pair of gears 12 and 13 for each of two of the weight has been omitted in Fig. 1 for clarity of illustration.

In operation let it be assumed first that the drive shaft 7 and driven shaft 20 are rotating at the same speed and that planetary gear 3 is carried without rotation. Governor plate 21, therefore, remains stationary with respect to its own center O′, although it is travelling about center O of the drive shaft 7. Referring to Fig. 4 it will be seen that the lines R—Q, S—Q and T—Q, through the centers of gravity R, S and T of the three eccentric weights and their centers Q are constantly substantially parallel each to the other and also substantially perpendicular to the radius O—O′. This right angle position of the weight arc is determined by selecting the meshing positions of gears 11, 12 and 13. The center of the governor plate travels about center O of shaft 7, inscribing clockwise the arc M—M. It is preferred that the rotation be from M to N, with the centers disposed as shown. The centrifugal force attributable to the weights at centers R, S and T produced by the angular momentum along arc M—N exerts on each of the stub shafts 18, a torque. This torque is transmitted through gears 12 and 13 to sun gear 11 thus tending to turn governor plate 21 and its keyed planetary 3. As long as this torque by the eccentric weights transmitted to planetary 3 exceeds the torque exerted on planetary 3 by its sun gear 2 of the output shaft, the output shaft 20 will continue to rotate at the speed of the input shaft 7.

Assume now that the driven shaft 20 stands loaded and stationary and that input shaft commences to drive. Then planetary 3 rolls on its sun gear 2, driving the governor plate and its mounted weights 19. The tooth ratios of the planetary 3, of the secondary sun gear 11 and the pinions 12 and 13 are so proportioned that the lever arm of the weights (represented by lines R—Q, S—Q and T—Q) always remains perpendicular, respectively, to the radials O—R, O—S and O—T. As the speed of driven shaft 7 increases the centrifugal force of the weights increases, the torque on the shaft 18 increases, and the drag on planetary gear 3 increases. When the speed increases to the point where this drag equals or exceeds the load on sun gear 2, the sun gear 2 commences to turn. When the driving shaft passes the threshold speed determined by the applied and frictional load on the driven shaft, planetary 3 stops and the sun gear 2 and spider plate 4 are effectively locked together.

Gear reduction

As shown in Fig. 5, speed reduction gearing can be conveniently incorporated in the transmission assembly of my invention. In Fig. 5 for example, which shows the underside of spider plate 4, sun gear 2 is spaced outwardly from the spider plate to make room between the plate and sun gear for planetary clusters as shown. On the far side of plate 4 in Fig. 5 is mounted the governor assembly of Fig. 4 which is centered in plug 9 in hole 8, the shaft 14 of the governor being keyed to the planetary 3. In this modification the sun gear 2 is keyed to one end of sleeve 101, to the opposite end of which is keyed pinion 101a. Torque or drag from planetary 3 is transmitted through sun gear 2 to sleeve 101, to pinion 101a, and hence to gears 100a and 100b. These last two gears form, respectively, clusters with pinions 100c and 100d which mesh with gear 103 keyed directly to the output shaft 1. The gears of clusters 100a–100c run together and are pivoted upon pin 100e, while the gears of clusters 100b–100d are also keyed together and are pivoted upon pin 100f. By the gear reduction shown the drag required on planetary gear 3, for a given power transmission, is substantially reduced.

One-way clutch type device

Still further, a one-way clutch is conveniently incorporated in the transmission assembly of my invention as shown in Fig. 6. Upon output shaft 1 is journalled sleeve 60 to one end of which is keyed gear 101, to the opposite end of which is keyed bar 32. On sleeve 60 further is rotationally journalled cluster 30 including sun gear 2 and pinion 2a. Cluster gear 2a meshes with planetary gears 31 which in turn rotate on studs 38 and mesh with the internal teeth 33 of ring sleeve gear 80. Sleeve 80 has a smooth internal raceway concentric with the center of rotation of bar member 32. Overrunning chuck rollers 37 which will roll freely in one direction only on this internal surface wedge when member 32 turns in the opposite direction. Sleeve 80 also carries external gear teeth 81 and smooth external surface 82 upon which overrunning chuck rollers 36 will roll. Surface 82 may turn in one direction only since rollers 36, which are a part of assembly 34 wedge as surface 80 turns in the opposite direction in assembly 34. Band 34 is free to turn on shaft 1 by journals not shown as is sleeve 80, cluster gear 30 and bar 32. Slidable brake 35, manually operated, is provided to stop rotation of assembly 34 and hold it firmly stationary with the transmission housing (not shown).

During operation driving member 4 (Fig. 5) turning counterclockwise, say, carries planets 100 around gear 103, turning gear 101 of Fig. 6 in clockwise direction. Assemblies 60 and 32 are thus turned in a clockwise direction but immediately wedge with sleeve 80 and carry sleeve 80 in a clockwise direction. Sleeve 80 at once wedges with assembly 34 and carries assembly 34 in a clockwise direction. Thus far no power is transferred to shaft 1 except for the frictional drag of the revolving assemblies. At the will of the operator brake 35 is applied, assembly 34 is locked to the transmission housing, assemblies 80 and 32 are thus stopped, planets 100 revolve around gear 101 carrying gear 103 and in turn turning drive shaft 1. The lowest gear ratio provided by the planet system is thus obtained and power is delivered to shaft 1 at this ratio until the driving member increases its speed.

As the driving member increases its speed the centrifugal governors mounted in openings 8 gradually stop gears 3 which in turn are in mesh with cluster 2—30—2a. This cluster is thus carried in a counterclockwise direction carrying with it planets 31 which mesh with internal gear 33. In this manner planets 31 by means of studs 38 carry member 32 in a counterclockwise direction. Member 32 is thus released from sleeve 80 except through planets 31 meshing with internal gear 33. Cluster 30, therefore, is carried in a counterclockwise direction by gear 3 of the centrifugal governor and drives member 32 in a counterclockwise direction by means of planets 31 whose back thrust is countered by internal gear 33 of sleeve 80. Assembly 80 at this point is still locked to the transmission housing by the overrunning clutch 36 in assembly 34. The gear ratio is thus gradually changed from the lowest value to a value determined by the planets 101, with the smaller gear of cluster 30, and with the internal gear 33. Thus gear 3′ mounted on a separate centrifugal governor begins to exert force to turn assembly 80 also in a counterclockwise direction. As gear 3′ ceases to turn by reason of the centrifugal force of the concentric weights of the governor, gear 81 of assembly 80 turns at the same speed as the driving member 4.

As assembly 80 begins to turn with gear 3′, overrunning clutch 36 releases and the entire assembly gradually comes to a point where it turns as a unit, thus establishing direct drive.

If the centrifugal parameters of the governors, in conjunction with predetermined gear ratios, are properly calculated for a certain load at a certain speed and at a certain torque for direct drive, any increase of load which will create a resistance greater than the drag produced by the governors were designed to hold, will allow assembly 80 to turn at a lower speed thus driving spider member 4 and thus allowing a mechanical advantage for driving member 4.

Should the load be increased to a point where the torque of the governor can no longer carry assembly 80 in a counterclockwise direction but rather allows it to move clockwise, assembly 80 immediately locks with member 34 through clutch 36, and the second gear train including cluster 30 begins to function. Should the load be still further increased to a point where the first governor or governors no longer are able to carry cluster 30 in a counterclockwise direction but rather allows cluster gear 30 to turn slightly clockwise, then gear 32 locks with assembly 80 thus establishing the lowest gear ratio of the transmission. Such a regression could conceivably only take place with an excessive overload and decreased speed.

Many modifications may be made in the governor of my invention and many applications may be found for the governor without departing from the scope of the invention described in the foregoing specification and defined in the following claim.

What I claim is:

In combination in a speed responsive power transmission, a driven shaft, a sun gear keyed to the end of said driven shaft, a plurality of evenly spaced planetary gears meshed with said sun gear, a drive shaft, means on said drive shaft for rotatably supporting said planetary gears, at least one eccentrically pivoted weight carried by said means for each planetary gear, and means for transmitting torque at each weight pivot to the respective planetary gears to place a drag on the planetary gears, said means comprising a governor plate coaxially fixed and rotatable with each planetary gear, a secondary sun gear coaxial with, but non-rotatable with respect to each planetary gear, a stub shaft journalled in said governor plate, a weight eccentrically mounted on said stub shaft, said stub shaft being geared through an idler gear to said secondary sun gear.

References Cited in the file of this patent

UNITED STATES PATENTS

| | | |
|---|---|---|
| 1,785,338 | Coleman | Dec. 16, 1930 |
| 1,810,282 | Ljungstrom | June 16, 1931 |
| 1,966,107 | Slonneger | July 10, 1934 |
| 2,006,160 | Dodge | June 25, 1935 |
| 2,179,405 | De Falco | Nov. 7, 1939 |

FOREIGN PATENTS

| | | |
|---|---|---|
| 502,346 | Great Britain | Mar. 10, 1939 |